United States Patent Office 2,695,322
Patented Nov. 23, 1954

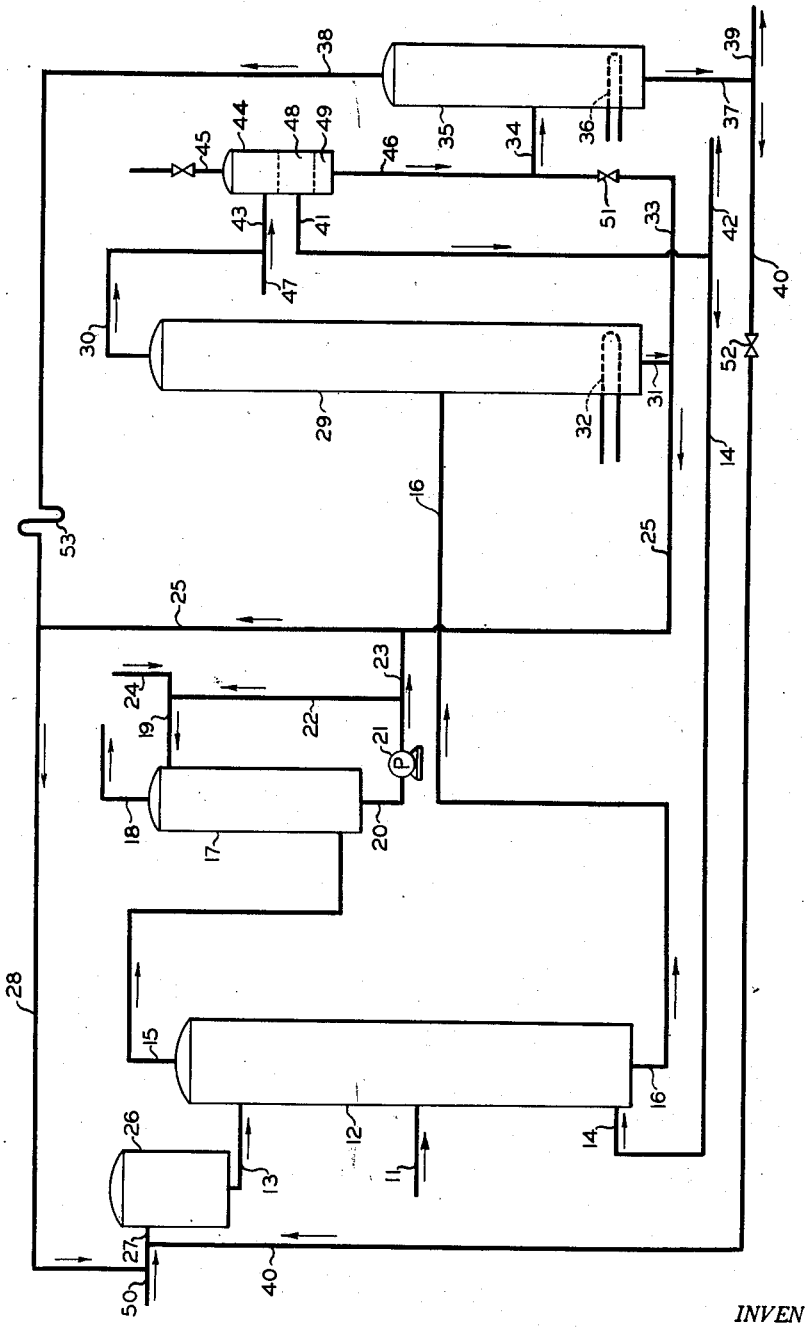

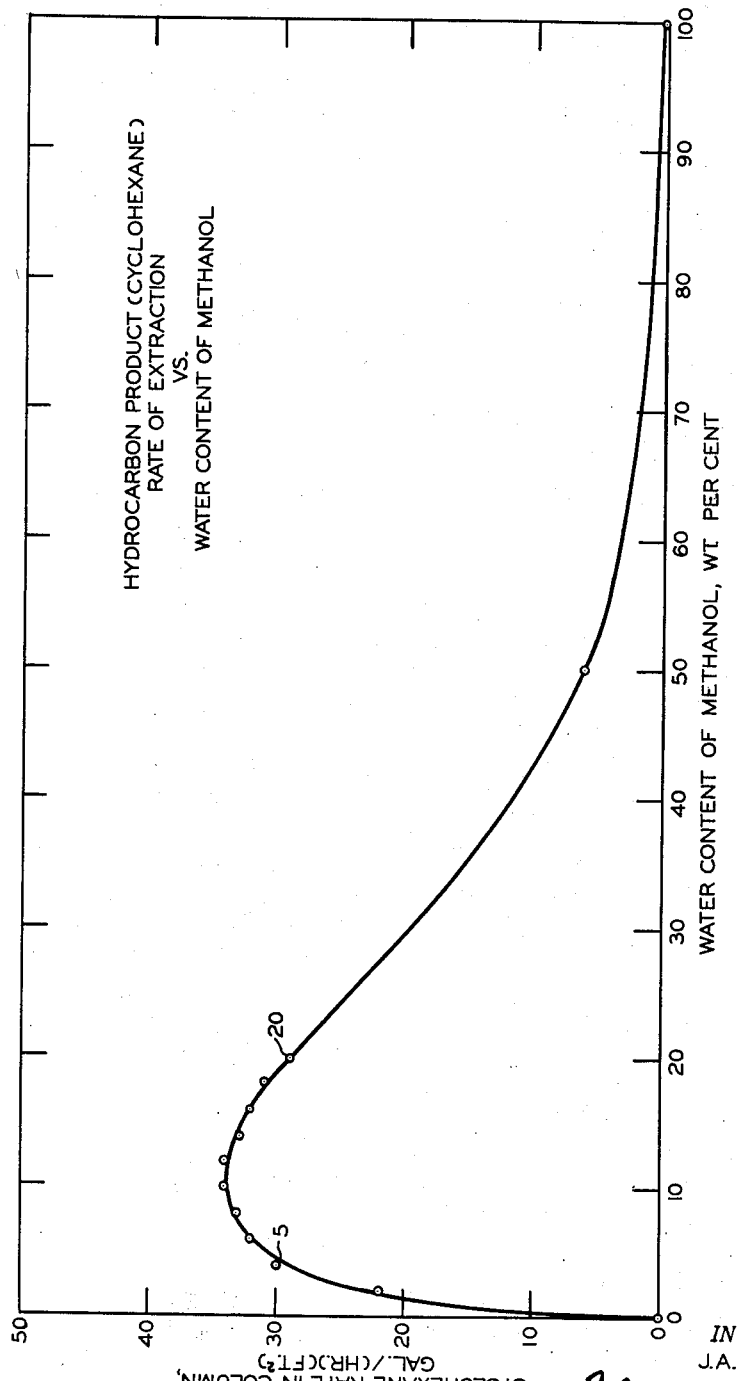

2,695,322

SEPARATION OF NAPHTHENES FROM A SATURATED HYDROCARBON MIXTURE WITH THE USE OF METHYL ALCOHOL AND WATER

John A. Weedman, Bartlesville, Okla., assignor to Phillips Petroleum Company, a corporation of Delaware Application October 24, 1949, Serial No. 123,260

6 Claims. (Cl. 260—666)

This invention relates to extraction. In one aspect it relates to an extraction process for the separation of naphthene hydrocarbons from paraffin hydrocarbons by solvent extraction. In another aspect it relates to a liquid-liquid extraction process for the separation of a naphthene hydrocarbon from a paraffin hydrocarbon by extraction with a solvent consisting of methanol and water.

My invention is directed to the use of methanol containing some water as a low viscosity extraction solvent. By the use of my solvent, I am able to increase the efficiency of extraction columns over that when conventional extraction solvents are used. As an example, in a 2-inch diameter, 10-foot tall, separation column, the following column efficiencies were obtained with solvents of different viscosities: (I) approximately one stage with monoethanolamine of viscosity 24.1 centipoises at 68° F.; (II) approximately five stages with furfural of viscosity approximately 3 centipoises at 68° F.; and (III) approximately ten stages with methyl alcohol containing 12% by weight of water with a viscosity of approximately 0.65 centipoise at 68° F.

I have found that the film thickness of a low viscosity solvent is less than that of a high viscosity solvent, and accordingly, diffusion rates are higher and increased extraction is obtained.

I have found that it is advantageous to use as high a percentage of water as possible in methyl alcohol in order to increase the density difference between the alcohol-water solution and the raffinate phase to expedite the rising or settling rate of the raffinate. However, the amount of water which can be used with methyl alcohol is limited by its effect on the solubility of one or more of the hydrocarbons being treated. For example, methyl alcohol containing a large percentage of water will dissolve less methyl cyclohexane than a methyl alcohol solution containing less water.

A further advantage in the use of the methanol-water solution as an extraction solvent is that only a very small quantity of methanol is carried out with the raffinate phase. When operating at about atmospheric temperature, from 0.04 to 0.05 per cent methanol is soluble in normal heptane, and accordingly, only this small proportion of methanol is carried from the extraction column in the raffinate phase. The alcohol may be recovered from the raffinate phase merely by washing with water, if desired. In contrast, furfural is soluble in n-heptane to the extent of about 8 per cent.

Diffusion rates are high due to thinning of the controlling film at the interface between the n-heptane raffinate and methanol-water phase as a result of the low viscosity of the methanol-water phase.

My extraction solvent is particularly useful in the separation of naphthene hydrocarbons from paraffin hydrocarbons whose boiling points are so close as to make the separation impossible, or at least very difficult, by fractional distillation.

Since my extraction solvent has a relatively low viscosity and not too high a solubility for hydrocarbons, I am able to operate an extraction column of conventional height and produce a raffinate phase containing substantially none of the hydrocarbon being extracted, and to produce an extract phase containing substantially none of the raffinate hydrocarbon. In other words, separation by extraction with my solvent produces a substantially pure raffinate product and a substantially pure extract.

Figure 1 represents diagrammatically one form of apparatus in which to carry out the process of my invention.

Figure 2 is a curve showing the relationship between the capacity of an extraction column of unit cross section and the water content of the extraction solvent.

Referring now to Figure 1 of the drawing, reference numeral 12 refers to an extraction column of conventional design. This column may be filled with bubble cap-tray liquid-liquid contacting apparatus, or it may contain any other conventional type of packing. The specific point in relation to this column is that the contacting apparatus within the column should be designed so as to promote efficient contacting of countercurrently moving liquid phases. This column 12 is equipped with several inlet lines and several outlet lines. Outlet line 15 is for removal of raffinate phase and line 16 is for removal of extract phase. Line 11 at a midpoint of the column is for introduction of the hydrocarbon mixture to be separated into its components. Line 13 is for introduction of the extraction solvent, while line 14 is for introduction of a recycle extract material.

The column 17, into which the line 15 leads, is for the water washing of the raffinate phase for removal of water soluble methanol. Overhead line 18 is for withdrawal of the water washed raffinate product. A line 19 is for introduction of water, while line 20 is for removal of the wash water from this column. A pump 21 in line 20 is for pumping of some or all of the wash water from line 20 through a line 22 for recirculation into the column 17 as conditions may dictate, or for removal of the wash water from the washing step through a line 23. Fresh water, from a source not shown, for washing purposes in this column is conducted through a line 24.

A still 29, into which line 16 passes, is for distillation of extract phase into at least some of its components. A line 30 is for removal of overhead vaporous product from this still while a line 31 is for removal of bottoms product. Re-boiling heat is supplied through a coil 32. The line 31 is connected with a line 25, which latter line is connected with line 28, through which material from the bottom of still 29 flows and by way of a line 27 into a solvent run storage tank 26. Pipes 47 and 43 are for passage of makeup or fresh water into a separator tank 44. An overhead pipe connection 45 is for release of vapors or undesired pressure from this tank. Pipe 46 connects the bottom of this tank with a line 34 for passage of material into an auxiliary still 35. Pipe 33 is connected with the pipe 31 for passage of material from the bottom of the still 29 through pipe 34 into the still 35. A valve 51 in line 33 is for controlling the flow of liquid through the pipe 33, or when closed entirely, will prevent flow of material from still 29 into still 35. The still 35 is equipped with an overhead vapor line 38 which communicates with a condenser 53. A bottoms draw-off line 37 serves for passage of bottoms through a line 39 for such disposal as desired, or through a line 40 for recycle in the process. Line 40 is equipped with a valve 52.

Tank 44 also has a side connection 41 for transfer of material through pipe 14 into the bottom of the extraction vessel 12, or for removal of material from the system through a pipe 42.

A pipe 50 connected to inlet pipe 27 is for the addition of whatever new or makeup material is desired to be introduced into the solvent charge tank 26. A reboiler coil 36 is positioned in a conventional manner in the reboiler section of still 35.

As exemplary in the description of the operation of my process, I will consider a mixture of close-boiling hydrocarbons consisting of normal heptane and methyl cyclohexane. The normal heptane boils at approximately 209.1° F., while the methyl cyclohexane boils at 213.7° F. It will be obvious to those skilled in the fractional distillation art that the separation of two such close boiling hydrocarbons by fractional distillation is a very difficult problem.

A 50–50 mixture of these hydrocarbons is introduced through line 11 into the extraction vessel 12. This vessel has previously been filled with a methanol-water solution containing 10–12% of water by weight. This solvent mixture dissolves the methyl cyclohexane preferentially over the normal heptane, and accordingly, the normal-heptane rises as a separate liquid phase to the top of the column. This raffinate of normal heptane containing about 0.04% methanol in solution is passed through the raffinate outlet line 15 into the methanol recovery column 17. Into this column a small amount of water, as for example, 1% by volume relative to the throughput of normal heptane is introduced through the line 19. This column 17 may be equipped with bubble cap or other liquid-liquid contacting apparatus, or, this tank may be merely a hollow vessel. Water from line 19 is merely introduced by spray or other means into the top, and as the water settles or flows by gravity downward in countercurrent contact with the normal heptane, the methanol is extracted. In order to reduce the amount of water used for removal of the small content of methanol, the wash water withdrawn through the draw-off line 20, may be recycled through the line 22 under the influence of the pump 21 through the line 19 into the top of the wash vessel. New water, as needed, is introduced into this wash system through the line 24 from a source not shown. Washings not desired to be recirculated are removed from this wash system through the line 23 and may be passed through lines 25, 28, and 27 into the solvent run tank 26.

The water washed raffinate product, consisting substantially of pure normal heptane in this case, is removed from the wash tank through the pipe 18 for such disposal as desired.

The extract phase, consisting of methanol, water, and methyl cyclohexane is removed from the extraction vessel through the line 16. This extract phase is introduced into the still 29 for separation into its components. Heat for reboiler purposes may originate from steam or other heating fluid passing through the reboiler coil 32. Since methyl cyclohexane forms an azeotrope with methanol, it boils at a temperature below the boiling point of pure methanol. The azeotrope will pass as a vapor from the top of this column through the overhead vapor line 30. This overhead product is passed from the vapor line 30 into the line 43 in which the vapor is contacted with cold water from line 47. This cold water is intended to condense the azeotrope vapor and to dissolve the condensed methanol for the separation of the latter from the methyl cyclohexane. Since the water solution of methanol is specifically heavier than the hydrocarbon, the former will settle to the bottom of the settling tank 44 as a water-methanol liquid phase 49. Floating upon this aqueous phase is a methyl cyclohexane liquid phase.

The aqueous methanol phase 49 is withdrawn from the settler 44 through the line 46 and is passed through the line 34 into the auxiliary still 35. In this still the methanol is distilled overhead. The water is withdrawn from this latter operation through the line 37 and may be passed through line 39 for such disposal or subsequent use as desired. If it is desired to recirculate some of this water into the extraction process for maintenance of the proper water content of the methanol, such water may be passed from line 37 through the line 40 and through line 27 into the solvent run tank 26. The valve 52 in line 40 may be used for controlling the flow of water, or when no water at all is desired for recycling from this source, the valve 52 may be closed.

The overhead methanol vapors from the still 35 are passed through the line 38 and are condensed in condenser 53, and the condensate is passed on through the line 28 and line 27 into the solvent run tank 26.

A relatively large proportion of water is added through line 47 to the azeotrope vapor for condensation and extraction of the methanol from the condensed azeotrope. A large proportion of water is necessary in this step in order to reduce the solubility of the methyl cyclohexane in the methanol-water solution in tank 44. However, any methyl cyclohexane retained in the methanol-water solution in tank 44 will merely be distilled as azeotrope in the column 35 and passed as overhead vapors through the line 38 to be condensed in the condenser 53. Such condensate will, as mentioned hereinbefore, pass on through lines 28 and 27 back into the solvent run tank 26.

The line 33 which connects with lines 25, 31, 34, and 46 is for passage of material from line 46 into line 25, or for passage of material from line 31 into line 34. When it is desired not to transfer material from line 46 to line 25 or from line 31 to line 34, valve 51 may be closed. Whether the methanol-water solution from the bottom of still 29 is transferred to the still 35 or the solution from the bottom of the separator 44 is transferred to line 25 will depend upon the water balance of the system. The control of such flow of materials for balancing the water content of the extraction solvent entering the extraction vessel 12 through line 13 will be understood by those skilled in such art.

The methyl cyclohexane phase which accumulates on top of the methanol-water phase in vessel 44 is removed through the side draw-off line 41. A portion of this methyl cyclohexane may be recycled from line 41 through the line 14 into the bottom of the extraction vessel 12 for extract refluxing purposes, as desired. Any methyl cyclohexane not desired for refluxing purposes may be withdrawn from the system through the line 42 for passage to storage or to other disposal, as desired.

By the term "close-boiling hydrocarbons" I mean hydrocarbons boiling within 8 or 10° F. of each other. My process may be used for separation of one or more naphthene hydrocarbons from admixture with one or more paraffin hydrocarbons since the process is not necessarily limited to a separation of one naphthene from one paraffin. Likewise, my process may also be used for the separation of one naphthene hydrocarbon from a paraffin hydrocarbon differing widely in boiling points. For example, cyclohexane boiling at 177.3° F. may be separated from normal hexane which boils at 155.8° F., or from normal heptane which boils at 209.1° F., or from any other paraffin hydrocarbon which boils at a temperature above the temperature of the operation of the extraction tower 12. The paraffin and naphthene hydrocarbons separated by my process should preferably be normally liquid hydrocarbons at the temperature of the extraction operation.

As an example of the operation of my process for the separation of a hydrocarbon mixture of narrow boiling range, cyclohexane boiling at 177.3° F. may be separated from one or a mixture of two or more of the following paraffin hydrocarbons, 2,2-dimethyl pentane boiling at 174.7° F., 2,4-dimethyl pentane boiling at 177.4° F., 2,2,3-trimethyl butane boiling at 177.8° F., and 3,3-dimethyl pentane boiling at 186.8° F. As a further example of a close-boiling material, methyl cyclohexane boiling at 212.5° F., may be separated from 2,2,4-trimethyl pentane (iso-octane) boiling at 210.7° F. and methyl cyclopentane boiling at 161.2° F. may be separated from normal hexane boiling at 155.8° F. Naphthenes may be separated from paraffins in such multicomponent mixtures as gasolines or kerosenes. Due to the low viscosity of my solvent mixture and accordingly the efficiency with which the extraction tower may be operated, the separation of the naphthene components of the above-mentioned mixtures is substantially complete, and a very pure naphthene and a very pure paraffin product are obtained.

The water content of the methanol may be varied within the limits of 5% to 20%, preferably from 9% to 12% by weight for best operation as indicated from the curve of Figure 2. At about 10% water content the methyl cyclohexane extraction capacity of the column is a maximum. As much water as possible should be used in the methanol to obtain the maximum density difference between the extract phase and the raffinate phase for increasing column capacities. This maximum water content is, however, limited by the decreasing solubility of cycloparaffin hydrocarbons in methanol as the water content increases. A further advantage of using relatively high water content in the methanol is that selectivity of the solvent for naphthene hydrocarbon over the paraffin hydrocarbon is markedly improved. The use of anhydrous methanol for the separation of a naphthene from a paraffin hydrocarbon results in substantially no separation whatever. 6 weight per cent of anhydrous methanol is soluble at 100° F. in such hydrocarbons as n-heptane while methanol containing 12 weight per cent of water dissolves in n-heptane to the extent of only 0.04 per cent by weight. Thus, less methanol is to be recovered is carried from the extraction column in the raffinate when using my solvent.

Such auxiliary apparatus as pumps, valves, pressure indicating and controlling apparatus, temperature indicating and controlling apparatus, flow controllers, and the like, have been omitted from the drawing and from the description for purposes of simplicity. The use of this auxiliary equipment is necessary to the successful operation of such a process, and the installation and use of such equipment is well understood by those skilled in the art. Apparatus for use in such a process as herein described may be constructed from materials readily available in commerce. No particular corrosion problems should be present, and accordingly, no special corrosion-resistant material of construction need ordinarily be used.

Temperature of operation of the extraction column is preferably atmospheric. The column may be operated at such temperature as may be occasioned during the winter season or during the summer season.

At temperatures much below 80° F. the viscosity of the methanol-water extraction solvent increases so that column capacities and column efficiencies are not at a maximum. At temperatures much above 120° F. the selectivity of the aqueous solvent for naphthenes over paraffins decreases due to the increased solubility of these hydrocarbons in my solvent. Temperatures and pressures required in the operation of the stills 29 and 35 are not especially critical, and these stills may be operated under desired temperatures and pressures as will give proper separation of materials.

In the description of my process, I described the treatment of a charge stock containing 50% paraffin and 50% naphthene hydrocarbon. The composition of this type of charge stock was merely taken as an example, and other concentrations of charge stock constituents may be used. Ratios of methanol-water extraction solvent to the hydrocarbon charge may also be varied within such limits as will give the proper and desired separation.

While specific processes have been described for purposes of illustration, the invention is not limited thereto but is defined by the scope of the following claims.

Having described my invention, I claim:

1. A method for separating naphthenes from a saturated hydrocarbon mixture consisting essentially of naphthenes having six carbon atoms per molecule and close boiling paraffins comprising contacting said mixture with methyl alcohol containing 5 to 20 per cent water based on the weight of the methyl alcohol, from this contacting operation separating a raffinate phase comprising paraffins and an extract phase comprising naphthenes, and recovering naphthenes having six carbon atoms from the extract phase as a product of the process.

2. A method for separating naphthenes selected from the group consisting of naphthenes having six carbon atoms, and naphthenes having seven carbon atoms, per molecule, from a saturated hydrocarbon mixture consisting essentially of said naphthenes and close boiling paraffins, comprising contacting said mixture with methyl alcohol containing 5 to 20 per cent water based on the weight of the methyl alcohol, from this contacting operation separating a raffinate phase comprising said paraffins and an extract phase comprising said naphthenes selected from said group, and recovering said naphthenes selected from said group from the extract phase as a product of the process.

3. A method for the separation of a naphthene hydrocarbon from admixture with a close boiling paraffin hydrocarbon comprising introducing said admixture of hydrocarbons into an extraction zone at an intermediate point, introducing an agent consisting essentially of methanol containing from 5 per cent to 20 per cent by weight of water based on the weight of the methanol into said zone at one end, countercurrently contacting said admixture of hydrocarbons and the solution of methanol-water under conditions to form a raffinate phase and an extract phase, removing said raffinate phase from said one end of said zone and washing the removed raffinate phase with water to remove methanol dissolved therein and recovering said paraffin hydrocarbon as one product of the process, removing the extract phase from the other end of said zone and subjecting said extract phase to distillation conditions in a distillation zone, removing from said distillation zone an overhead vaporous product comprising a naphthene hydrocarbon-methanol azeotrope, condensing said overhead vapors and adding sufficient water to the condensate to form a naphthene hydrocarbon liquid phase and a water-methanol liquid phase, recycling a portion of said naphthene phase to said other end of said extraction zone and removing the remaining naphthene phase as the second product of the process, distilling said water-methanol phase to produce a bottoms product of water and an overhead vaporous methanol product, condensing this vapor and recycling the condensate to the extraction zone.

4. The method of claim 3 wherein the solution of methanol containing water contains from 9 to 12 per cent water by weight based on the methanol.

5. The method of claim 4 wherein the admixture of hydrocarbons to be separated comprises methyl cyclohexane and normal heptane.

6. In the method of claim 3 countercurrently contacting said admixture of hydrocarbons and said solution of methanol and water at a temperature between the limits of 80° and 120° F.

References Cited in the file of this patent

UNITED STATES PATENTS

| Number | Name | Date |
|---|---|---|
| 1,960,461 | Stratford | May 29, 1934 |
| 2,002,533 | Frolich et al. | May 28, 1935 |
| 2,068,126 | FitzSimons | Jan. 19, 1937 |
| 2,288,853 | Sowers | July 7, 1942 |

FOREIGN PATENTS

| Number | Country | Date |
|---|---|---|
| 257,270 | Great Britain | Feb. 20, 1928 |
| 439,674 | Great Britain | Dec. 11, 1935 |